No. 630,469. Patented Aug. 8, 1899.
J. L. RITER.
WHIFFLETREE HOOK.
(Application filed June 8, 1899.)

(No Model.)

Witnesses:—
A. W. J. Beall.
G. S. Elliott.

John L. Riter,
Inventor.
by John B. Thomas & Co.,
Attorneys.

THE NORRIS PETERS CO., PHOTO-LITHO., WASHINGTON, D. C.

UNITED STATES PATENT OFFICE.

JOHN L. RITER, OF BROWNSVILLE, INDIANA.

WHIFFLETREE-HOOK.

SPECIFICATION forming part of Letters Patent No. 630,469, dated August 8, 1899.

Application filed June 8, 1899. Serial No. 719,803. (No model.)

*To all whom it may concern:*

Be it known that I, JOHN L. RITER, a citizen of the United States, and a resident of Brownsville, in the county of Union and State of Indiana, have invented certain new and useful Improvements in Whiffletree-Hooks, of which the following is a specification.

This invention is an improvement in whiffletree-hooks; and the object of the said invention is to provide a hook of this general character which shall be strong and durable and serve to make a firm and secure connection between a trace and singletree, also between the singletree and doubletree, presenting practically a locking-hook to positively prevent accidental disengagement of the parts, the particular shape of the hook being combined with a metal tip or ferrule of peculiar construction to distribute the strain on the hook in use and provide for readily and conveniently placing the trace in engagement therewith and disengaging it therefrom.

The invention also contemplates a particular construction and arrangement of the parts to give a smooth finish and present a whiffletree connection of neat appearance, in addition to the feature of strength and durability.

The following specification enters into a detail description of the invention, including its peculiar features and advantages of construction, and what it is desired to protect in the construction and combination of parts is more specifically set forth in the appended claims.

Figure 1:
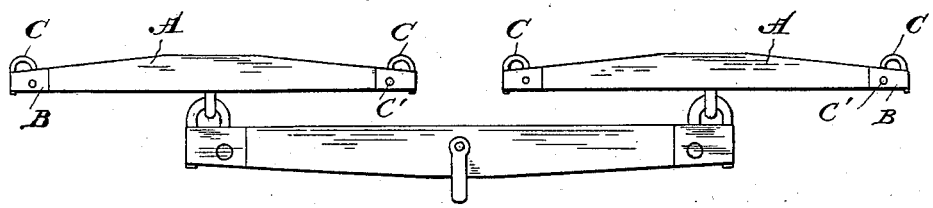
Figure 2:
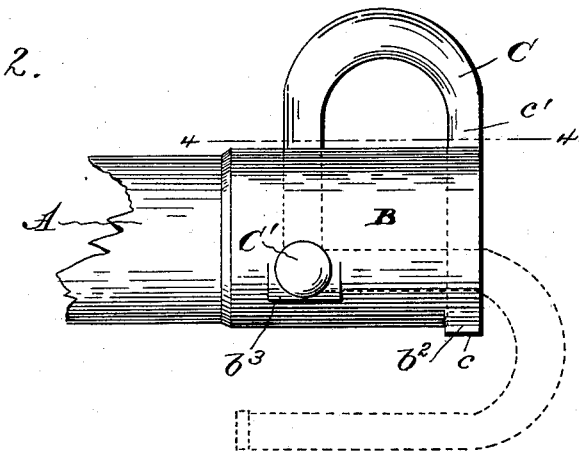
Figure 3:
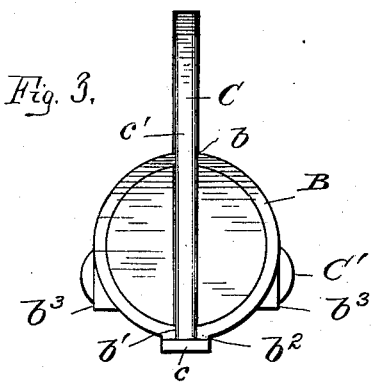
Figure 4:
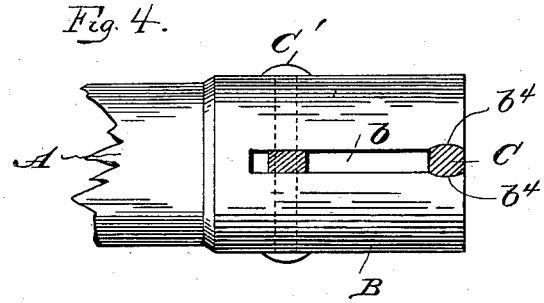

In the accompanying drawings, wherein like letters of reference designate similar parts throughout the several views, Figure 1 is a plan view illustrating the application of the invention in forming the connections between the doubletree and singletrees in addition to its use as a trace connection. Fig. 2 is an enlarged detail plan view of the whiffletree-hook. Fig. 3 is an end view. Fig. 4 is a sectional view on the line 4 4 of Fig. 2.

Referring to said drawings, A designates the singletree, B the ferrule or metal cap, and C the hook.

In applying the ferrule or metal cap to the singletree the end of the latter is recessed inward centrally, as indicated, in connection with the end view Fig. 3, the said recess receiving the hook and permitting of the required swinging movement of the same. The ferrule or metal sleeve B fits over the end of the singletree and is provided with open-ended slots $b$ and $b'$, which open into the aforesaid recess in the singletree and also guide the hook, the metal sleeve presenting plane surfaces $b^2$ at each side of the slot $b'$ for the purpose hereinafter explained. The said sleeve or ferrule is attached to the singletree by the pin $C'$, forming the pivot connection of the hook, the ends of said pin being riveted or upset upon the sleeve, and for this purpose the sleeve is preferably provided with the plane surfaces $b^3$. The sleeve B is provided with oppositely-curved recesses $b^4$ $b^4$ at the forward end of the slot $b$ to receive the bill portion of the hook and serve to hold said hook in a closed position.

The hook C is preferably U-shaped, as shown, and is pivoted in the recess of the singletree upon the pivot-pin $C'$, the latter being located a slight distance in the rear of the longitudinal center of the singletree in order that when the said hook is swung upon its pivot to the position shown in dotted lines, Fig. 2, the bill will be located away from the singletree to permit the eye of the trace or other connection to be placed in engagement therewith. The hook should also be of such length that in swinging it from the position shown in dotted lines to that shown in full lines, and vice versa, a space will be left between the loop end of said hook and the end of the singletree, and the bill portion is of such length that when the hook is closed the end of the same will project beyond the rear side of the sleeve or ferrule, the said end having a head or lateral projections $c$, which bear against said ferrule or sleeve at the opposite sides of the slot $b'$, through which the bill projects, as aforesaid. In the closed position of the hook the outer edge of the bill portion thereof is flush with the outer end of the singletree, and the sides of said bill portion, near the loop, are slightly rounded at $c'$ $c'$ to engage the opposing recesses $b^4$ of the sleeve or ferrule and serve to hold said hook closed, the sleeve or ferrule being of sufficient resiliency at this point to permit the hook to pass into the recesses.

It will be noted from the foregoing description, in connection with the accompanying drawings, that when the hook is closed or in position, completing the connection of a trace therewith, the strain on said hook will be distributed to two points—viz., the shank end and the bill end—thus relieving the pivot of all the strain which usually comes upon the same when the common form of hook is employed. It is therefore apparent that a lighter hook can be employed than is ordinarily used and that the strength and durability of the hook is greatly increased.

In connecting a trace to the hook the latter is swung upon its pivot to bring the bill in the rear of the singletree, and after the trace has been passed into engagement therewith the hook is swung forward, carrying the trace at the loop end, and when it reaches the limit of its forward movement the said hook forms, practically, an eye in connection with the end of the singletree, and the bill engages the recesses of the sleeve and locks the hook closed, while the tensile strain is distributed to both members of the hook, making it stronger and more durable. It will also be seen that the construction and arrangement of parts attain the desired ends in a simple and effective manner, leaving smooth surfaces and no projections which are likely to catch in the harness.

Having thus described the invention, I claim—

1. In a whiffletree-hook, the combination with the singletree recessed at its end substantially as shown, of a sleeve fitting the end of the singletree and having slots on a line with the aforesaid recess, and a hook pivoted in the recess and having an extended bill with a head or projections at its end, the said head being adapted to bear against the rear side of the sleeve when the hook is closed, for the purpose set forth.

2. In a whiffletree-hook, the combination with the singletree recessed at its end substantially as shown, of a sleeve fitting the end of the singletree and having slots on a line with the aforesaid recess and opposing recesses at the forward end of the longer slot, and a hook pivoted in the recess at the rear part of the singletree, said hook having an extended bill with a head or projections at its end adapted to engage the sleeve at the sides of the slot in the rear part of said sleeve when the hook is closed, and the bill portion also engages the opposing recesses in the slot at the forward part of the sleeve, substantially as herein shown and described.

JOHN L. RITER.

Witnesses:
  TELLE BOGGS,
  EARL W. CARLOS.